United States Patent [19]

Bauer

[11] 4,124,930

[45] Nov. 14, 1978

[54] METHOD FOR MANUFACTURING A CHARACTERS CARRYING AGGREGATE FOR PRINTING MACHINE

[75] Inventor: Eric Bauer, Neuchâtel, Switzerland

[73] Assignee: Caracteres S.A., Neuchâtel, Switzerland

[21] Appl. No.: 776,951

[22] Filed: Mar. 14, 1977

[51] Int. Cl.[2] .............................................. B23Q 17/00

[52] U.S. Cl. ........................................ 29/407; 29/464; 29/467; 400/174; 400/144.2; 264/249; 269/54.5

[58] Field of Search ................. 29/407, 464, 467, 509, 29/522, 418; 197/53, 54, 36, 64; 269/54.5; 264/249, 241, 328, 23; 156/73.1, 245

[56] References Cited

U.S. PATENT DOCUMENTS

| | | | |
|---|---|---|---|
| 3,419,297 | 12/1968 | Diepenhorst et al. | 264/249 X |
| 3,754,310 | 8/1973 | Shea | 264/249 X |
| 3,848,722 | 11/1974 | Bolan | 197/53 |
| 3,970,186 | 7/1976 | Sohl et al. | 197/54 |
| 4,018,639 | 4/1977 | Staples, Jr. | 29/418 X |
| 4,037,706 | 7/1977 | Sohl et al. | 197/54 |

*Primary Examiner*—Victor A. DiPalma
*Attorney, Agent, or Firm*—Silverman, Cass & Singer, Ltd.

[57] ABSTRACT

A characters carrying aggregate or assembly for a printing machine includes a characters carrying disk carrying the characters on the outer ends of radial arms extending from the disk. The disk is mounted on a hub and may include a crown mounted opposite the hub. The assembly is manufactured on a base plate having at least two positioning pins corresponding to two positioning holes in the disk. The base-plate includes a central hole or protrusion for aligning with a central protrusion or hole in the hub. The base-plate further includes an alignment finger which extends through an orientation hole in the disk into a specific oriented alignment with an orientation hole in the hub. The aligned hub and disk are then secured together.

4 Claims, 7 Drawing Figures

METHOD FOR MANUFACTURING A CHARACTERS CARRYING AGGREGATE FOR PRINTING MACHINE

The present invention relates to a method for manufacturing a characters carrying aggregate for a printing machine. The aggregate has a disk provided with elastic resilient radial arms having at their end, the said characters, and at least a central hub made of plastic material, applied against the said disk.

The invention relates also to a tooling for carrying out this method.

The method according to the invention is characterized by the fact that one forms the said disk provided with a central hole and with at least two positioning holes, by moulding the said hub provided with a central hole or with a central protrusion and with an orientation hole of the characters carrying aggregate on the printing machine, places the said disk on a base-plate provided with a central protrusion or with a central hole and with at least two positioning pins the position of which corresponds to the position of the two positioning holes of the disk, while engaging these pins into the said positioning holes, and places the said hub on the said disk, its central protrusion or its central hole being engaged in the central hole or on the central protrusion of the base-plate, the base-plate being provided with an orientation finger passing with play through a hole provided in the disk and which engages, without lateral play, in the orientation hole of the said hub, the whole in such a way that the hub and the disk be on the one hand coaxial to each other and on the other hand in a determined relative angular position, then effects the assembling of these two elements, disk and central hub.

The tooling according to the invention is characterized by the fact that it comprises a base-plate provided with a protrusion or a central hole for the centering of the hub, at least two pins for the positioning of the disk, and a finger for the orientation of the hub.

The drawing shows, by way of example, one embodiment of the object of the invention.

The characters carrying aggregate represented has three elements which are assembled together, i.e. a thin metallic disk 1, a front hub 2, made of plastic material, and a rear crown 3, also made of plastic material.

Figure 4:
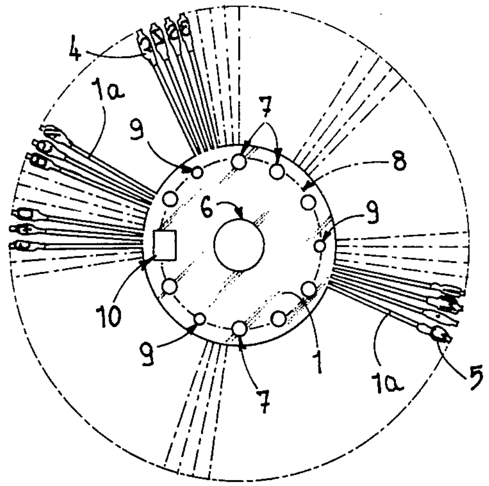
FIG. 4 is a plan view of a first element of the said characters carrying aggregate.

The metallic disk 1 is provided with radial resilient arms 1*a* on the ends of which are moulded elements of plastic material 4 each of which includes the reversed relief 5 of at least one character. This disk is provided with a central aperture 6, with eight holes 7 situated on a circle indicated at 8 at FIG. 4, coaxial to the central aperture 6. The disk also includes three holes 9, of smaller diameter than the holes 7, situated on the circle 8, at 120° one from each other, and with a rectangular aperture 10, also situated on the said circle.

Figure 1:
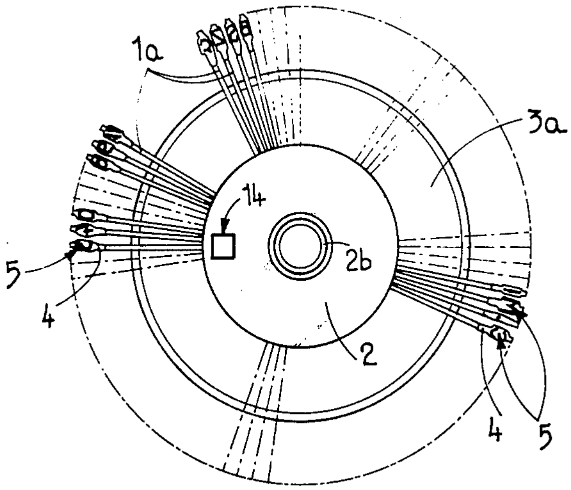
FIG. 1 is a plan view, from the front face, of a characters carrying aggregate for a printing machine.
Figure 2:
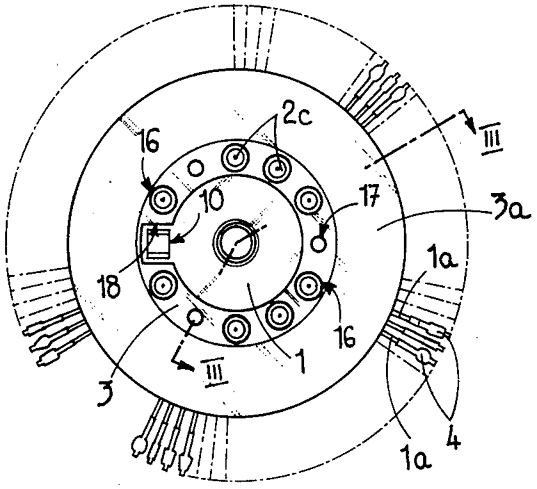
FIG. 2 is a plan view thereof, from the rear face.
Figure 3:
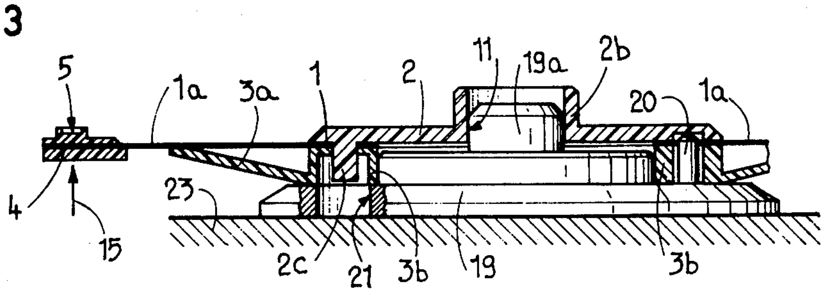
FIG. 3 is an axial sectional view of this aggregate, along line III—III of FIG. 2, at a larger scale, the aggregate being represented during its manufacture.
Figure 5:
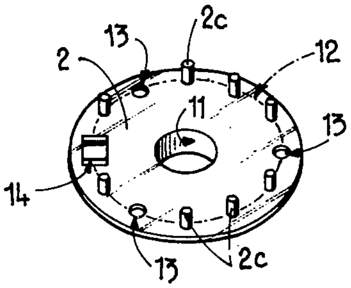
FIGS. 5 and 6 are perspective views of two other elements of this aggregate.
Figure 6:
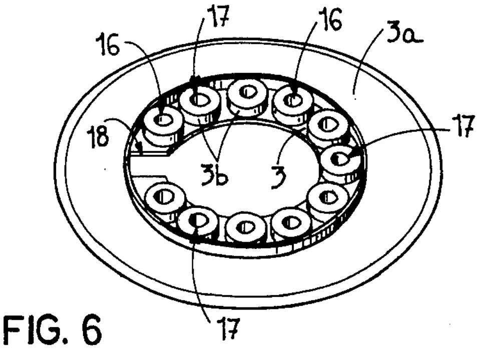

The hub of plastic material 2 is provided with a central protrusion 2*b* in which is provided a bore 11 (FIG. 3). Eight pins 2*c* are disposed on a circle indicated at 12 in FIG. 5, coaxial to the said central protrusion 2*b*, the radius of which corresponds to that of the circle 8. This hub is moreover provided with three recesses 13, arranged at 120° one from each other, situated on the circle 12, and with a rectangular aperture 14 also situated on the circle 12.

The rear crown 3 has the shape of a cup, presenting a bearing portion 3*a* which bears by its periphery, on the resilient arms 1*a*, in the vicinity of their end to serve as a damper for the back movement of the resilient arms 1*a* after each printing operation. The printing operation producing a displacement of the arms 1*a* according to the direction of the arrow 15 of FIG. 3.

This crown is provided, on its inner face, with eleven cylindrical hole or hollow cylindrical projections 3*b*, arranged on a circle coaxial to the crown. The bottom of eight of which is provided with holes 16 the diameter of which corresponds to the diameter of the pins 2*c*. The bottom of three others of which, arranged at 120° one from each other, are provided with holes 17 the diameter of which corresponds to the diameter of the holes 9 of the disk 1. The crown 3 is also provided with a notch 18 opening on its central hole.

Figure 7:
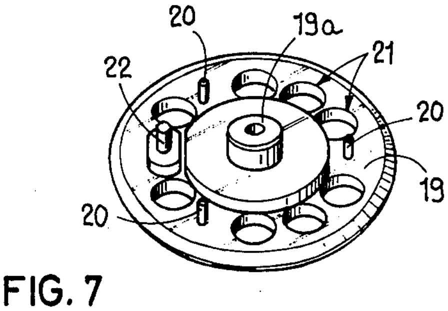
FIG. 7 is a perspective view of a tooling for the mounting of the said characters carrying aggregate.

The tooling serving to the mounting of the characters carrying aggregate comprises a base-plate 19 (FIGS. 3 and 7), made of steel, provided with a central protrusion 19*a* the diameter of which corresponds to the bore 11 of the protrusion 2*b* of the hub 2. The base-plate 19 is provided with three pins 20 arranged at 120° one from each other on a circle coaxial to the protrusion 19*a*, and the diameter of which corresponds to the diameter of the holes 9 of the disk 1 and of the holes 17 of the crown 3. The base-plate 19 is moreover provided with eight holes 21, arranged on a same circle coaxial to the protrusion 19*a*, and carries an orientation finger 22 also placed on this circle.

The mounting of the characters carrying aggregate is carried out as follows:

The base-plate being placed on a support 23 (FIG. 3), one places first thereon the crown 3 while engaging the pins 20 of the base-plate into the holes 17 and the finger 22 into the notch 18. It is to be noted that the position of the said crown does not have to be extremely precise so that the pins 20 can pass freely through the holes 17 as well as the finger 22 can engage freely the notch 18.

The disk 1 is then placed on the crown 3, the pins 20 passing through the holes 9 of the disk and the finger 22 passing through its rectangular opening 10. It is to be noted that the finger 22 can pass through the opening 10 of the disk with play, but it is not the same for the pins 20 which must fix exactly in the holes 9 of the disk so that the position of the disk on the base-plate is very precise.

The hub 2 is finally placed on the disk 1, its bore 11 being engaged on the central protrusion 19*a* of the base-plate. The pins 2*c* of the hub pass freely through the holes 7 of the disk and through the holes 16 of the crown 3. The finger 22 of the base-plate engages without lateral play the rectangular opening 14 of the hub 2 the edges of which are chamfered for slightly forcing on the said finger. Two splits could be provided in the hub 2, on both sides of the chamfered edges of its opening 14, so as to render these edges slightly resilient so that they press laterally on the finger 22. The ends of the pins 20 of the base-plate, which go slightly beyond the disk 1, engage freely the recesses 13 of the hub 2.

Owing to the engagement of the protrusion 19*a* of the base-plate 19 into the bore 11 of the hub 2, the hub is perfectly centered with respect to the base-plate. Moreover, owing to the engagement of the finger 22 of the base-plate into the opening 14 of the hub, the angular position of the hub with respect to the base-plate is also determined very precisely.

Consequently, since the disk 1 and the hub 2 both have a position perfectly determined with respect to the base-plate, they also have a position perfectly determined one with respect to the other.

The base-plate is then reversed, while provided with the three elements of the characters carrying aggregate, and while exerting on the whole an axial pressure for preventing said elements from being separated from the base-plate. A punch previously heated is then driven against the end of the pins 2*c*, which are reached through the holes 21 of the base-plate, for deforming these ends and crushing them so that they fill the bottom of the recesses provided by the cylindrical protrusions 3*b* of the crown 3. The ends are turned back on their respective bottoms like a setting or rivetting, ensuring the precise and secured assembling, without play, of the three elements of the characters carrying aggregate.

As a modification, the centering of the hub 2 on the base-plate 19 could be effected by means of the outer surface of the protrusion 2*b* of the said hub, and not by means of its bore 11, in which case the base-plate should be provided with a central hole replacing its central protrusion 19*a*.

I claim:

1. A method of manufacturing a characters carrying aggregate for printing machines on a universal base-plate having one of a central protrusion or central hole, at least two upstanding positioning pins and an orientation finger, said aggregate including a disk provided with resilient radial arms adapted to have said characters at their end and a central hub, said method comprising:

forming said disk with a central hole, at least two positioning holes corresponding to the spacing of said base-plate pins, and an orientation aperture corresponding to the alignment of said base-plate positioning finger of a size greater than the size of said finger;

forming said hub with one of a central hole adapted to fit over said base-plate protrusion or a central protrusion adapted to fit in said base-plate hole, and an orientation hole corresponding to the alignment of said base-plate positioning finger of a size equal to or slightly less than the size of said finger;

mounting said disk on said base-plate with said positioning pins engaged in said positioning holes and said finger freely passing through said orientation aperture;

mounting said hub over said disk on said base-plate with one of said central hole mounted on said base-plate central protrusion or said central protrusion mounted in said base-plate central hole and said finger closely fitted into said orientation hole; and securing said aligned hub and disk together.

2. The method claimed in claim 1 wherein:

said hub is formed with blank recesses adapted to open toward said base-plate and oriented to allow said base-plate pins to extend into said recesses when said hub is mounted on said base-plate.

3. The method as claimed in claim 1 wherein:

said base-plate includes a central protrusion and said hub is formed with a central hole and said disk central hole is formed larger than said protrusion to allow said disk to be mounted on said base-plate with said central hole at least partially spaced from said protrusion.

4. The method as claimed in claim 1 further including:

forming a crown with a set of traversing passages, including two corresponding to the spacing of said base-plate pins and a notch corresponding to the spacing of said base-plate finger;

forming said disk with a set of holes corresponding to the spacing of said crown passages;

forming said hub with a set of axial pins corresponding to the spacing of said crown passages and of a size to pass through said passages;

mounting said crown on said base-plate with said pins passing through two of said crown passages and said finger passing through said crown notch;

mounting said disk on said crown and base-plate with said positioning pins engaged in said disk positioning holes;

mounting said hub on said disk and base-plate, said hub pins passing through said disk holes and said crown passages; and deforming the ends of said hub pins against said crown to secure said disk, hub and crown into a fixed and aligned assembly.

* * * * *

UNITED STATES PATENT AND TRADEMARK OFFICE

CERTIFICATE OF CORRECTION

PATENT NO. : 4,124,930

DATED : November 14, 1978

INVENTOR(S) : BAUER, ERIC

It is certified that error appears in the above-identified patent and that said Letters Patent are hereby corrected as shown below:

On the Title page, following the filing date block [22] insert the priority information block [30]

--Foreign Application Priority Data

October 19, 1976 Switzerland 13212/76

Signed and Sealed this

*Fifteenth* Day of *May 1979*

[SEAL]

*Attest:*

RUTH C. MASON
*Attesting Officer*

DONALD W. BANNER
*Commissioner of Patents and Trademarks*